US010375625B1

(12) United States Patent
Birgel et al.

(10) Patent No.: US 10,375,625 B1
(45) Date of Patent: Aug. 6, 2019

(54) SYSTEM AND METHOD FOR TRIANGULATING LOCATION OF WIRELESS PROCESS AUTOMATION TRANSMITTER FOR USE BY SMART GLASS DEVICE

(71) Applicant: Endress+Hauser SE+Co. KG, Maulburg (DE)

(72) Inventors: Eric Birgel, Schopfheim (DE); Tareq Al Qaisi, Plainfield, IN (US); Gautham Karnik, Whitestown, IN (US); Matthew Krygier, Noblesville, IN (US)

(73) Assignee: Endress+Hauser SE+Co. KG, Maulburg (DE)

(*) Notice: Subject to any disclaimer, the term of this patent is extended or adjusted under 35 U.S.C. 154(b) by 0 days.

(21) Appl. No.: 16/198,091

(22) Filed: Nov. 21, 2018

(51) Int. Cl.
*H04W 48/10* (2009.01)
*G01S 5/02* (2010.01)
*G01S 5/06* (2006.01)
*H04W 48/16* (2009.01)
*H04W 84/18* (2009.01)

(52) U.S. Cl.
CPC .......... *H04W 48/10* (2013.01); *G01S 5/0221* (2013.01); *G01S 5/06* (2013.01); *H04W 48/16* (2013.01); *H04W 84/18* (2013.01)

(58) Field of Classification Search
CPC ..... H04W 48/10; H04W 48/16; H04W 84/18; G01S 5/0221; G01S 5/06
See application file for complete search history.

(56) References Cited

U.S. PATENT DOCUMENTS

2016/0183057 A1* 6/2016 Steiner .................. H04W 4/027
455/456.1
2016/0238692 A1* 8/2016 Hill ....................... G02B 27/017

* cited by examiner

*Primary Examiner* — Marisol Figueroa
(74) *Attorney, Agent, or Firm* — Kelly J. Smith; PatServe

(57) ABSTRACT

A system for triangulating a location of a wireless process automation transmitter for use by a smart glass device is provided. A wireless process automation transmitter transmits a join request signal, and a plurality of network receivers receive the join request signal and transmit time of arrival information to a network manager. The network manager uses the information, including network receiver information and corresponding location information, to triangulate a location of the wireless process automation transmitter. A smart glass device location is triangulated in a similar manner but may also use the wireless process automation transmitter to receive a join request signal and transmit time of arrival information to the network manager. With the location information of both devices, along with an orientation angle of the smart glass device, the network manager determines if the wireless process automation transmitter is in a field of view of the smart glass device.

20 Claims, 10 Drawing Sheets

SYSTEM AND METHOD FOR TRIANGULATING LOCATION OF WIRELESS PROCESS AUTOMATION TRANSMITTER FOR USE BY SMART GLASS DEVICE

TECHNICAL FIELD

The present disclosure relates generally to the use of smart glass devices in process automation and, more particularly, to the interfacing of smart glass devices and wireless process automation transmitters.

BACKGROUND OF THE INVENTION

Process automation, particularly in industry, involves the automatic control of a process, and incorporates the use of a network of sensors, controllers, actuators, and the like. Wireless sensor networks are becoming more commonplace and are used to monitor and control various processes. It is beneficial for the acquisition of data from these networks and devices to be easier and efficient to improve the overall process.

Accordingly, there remains a need for further contributions in this area of technology.

SUMMARY OF THE INVENTION

According to at least one aspect, to solve these problems with the current state of the art, the present disclosure discloses a system and method to triangulate locations of wireless process automation transmitters for use by a smart glass device.

According to one aspect, a system for triangulating a location of a wireless process automation transmitter for use by a smart glass device includes a network manager in communication with a database of network receiver information and corresponding location information. A first wireless process automation transmitter is configured to transmit a first join request signal, and a plurality of network receivers are configured to receive the first join request signal and transmit a first set of time of arrival information to the network manager. The network manager is configured to triangulate a location of the first wireless process automation transmitter based on the location information of the network receivers and the first set of time of arrival information. The smart glass device is configured to transmit a second join request signal, and the plurality of network receivers are configured to receive the second join request signal and transmit a second set of time of arrival information to the network manager. The network manager is configured to triangulate a location of the smart glass device based on the location information of the network receivers and the second set of time of arrival information. The smart glass device is configured to transmit an orientation angle of the smart glass device to the network manager. The network manager is configured to determine if the first wireless process automation transmitter is in a field of view of the smart glass device based on the location of the first wireless process automation transmitter, the location of the smart glass device, and the orientation angle. A display of the smart glass device is configured to display information corresponding to the first wireless process automation transmitter if the first wireless process automation transmitter is in the field of view of the smart glass device.

According to another aspect, a method for triangulating a location of a wireless process automation transmitter for use by a smart glass device includes steps of storing receiver information, including location information, for a plurality of receivers in a network. The method also includes steps of transmitting a first join request signal from a wireless process automation transmitter, receiving the first join request signal at the receivers and transmitting a first set of time of arrival information to the network manager, and triangulating a location of the wireless process automation transmitter by the network manager based on the location information of the receivers and the first set of time of arrival information. The method also includes steps of transmitting a second join request signal from a smart glass device, receiving the second join request signal at the receivers and transmitting a second set of time of arrival information to the network manager, and triangulating a location of the smart glass device based on the location information of the receivers and the second set of time of arrival information. According to the method, an orientation angle of the smart glass device is transmitted from the smart glass device to the network manager. Further, the method includes steps of determining if the wireless process automation transmitter is in a field of view of the smart glass device based on the location of the wireless process automation transmitter, the location of the smart glass device, and the orientation angle, and displaying information corresponding to the wireless process automation transmitter on a display of the smart glass device if the wireless process automation transmitter is in the field of view of the smart glass device.

BRIEF DESCRIPTION OF THE DRAWINGS

The described embodiments and other features, advantages, and disclosures contained herein, and the manner of attaining them, will become apparent and the present disclosure will be better understood by reference to the following description of various embodiments of the present disclosure taken in conjunction with the accompanying drawings, wherein.

DETAILED DESCRIPTION

The present disclosure discloses systems and methods for utilizing smart glass devices in industrial environments. Further, the present disclosure discloses systems and methods for integrating smart glass devices in process automation environments. Yet further, smart glass devices are integrated with wireless sensors to make data acquisition and maintenance easier, particularly in process automation. Various embodiments will now be presented in conjunction with the figures which illustrate the embodiments. It will be understood that no limitation of the scope of this disclosure is thereby intended.

Figure 1:
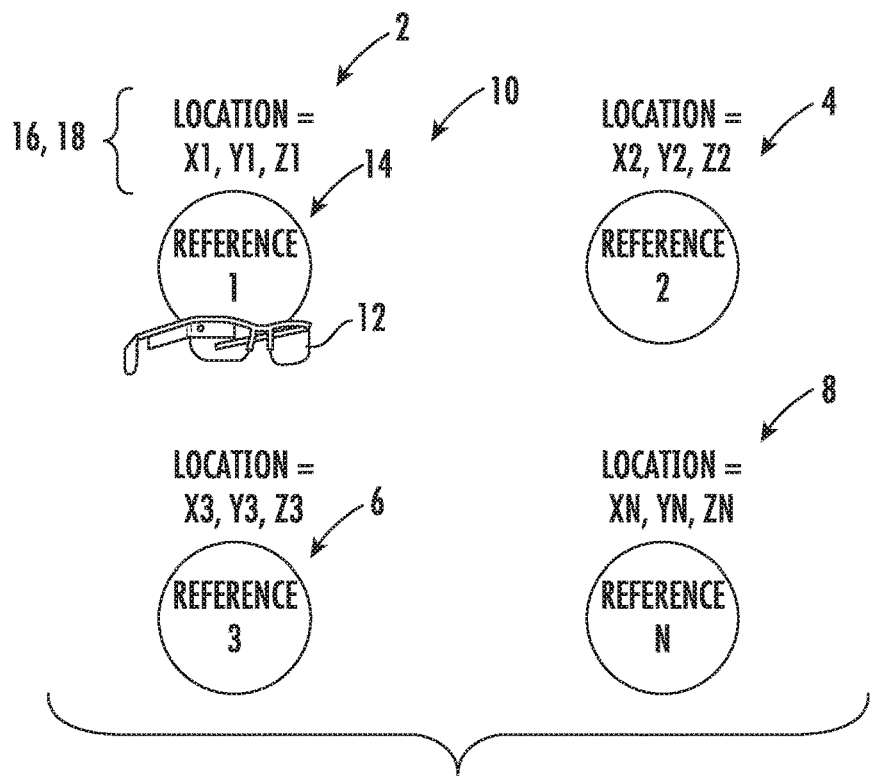
FIG. 1 shows an illustration of initialization of smart glass device location data.

Turning now to FIG. 1, a plurality of reference locations 2, 4, 6, 8 are shown. The reference locations 2, 4, 6, 8 may be at various locations throughout an area 10, such as a work site, plant or factory, for example. According to the exemplary embodiment, the reference locations 2, 4, 6, 8 may be docking/charging stations for a smart glass device 12. The smart glass device 12 may be a wearable device, such as, for example, smart glasses or augmented reality glasses that add information to what a wearer sees.

The smart glass device 12 is initialized with smart glass device location data 18 relative to at least one of the reference locations 2, 4, 6, 8. For example, when the smart glass device 12 is powered on at a docking/charging station 14, the smart glass device 12 may be initialized with location data 16 from the selected docking/charging station 14. That is, information regarding the location of the selected docking/charging station 14, which may be preprogrammed into the selected docking/charging station 14, may be loaded onto the smart glass device 12, thus setting the smart glass device location data 18 relative to the selected docking/charging station 14.

Figure 2:
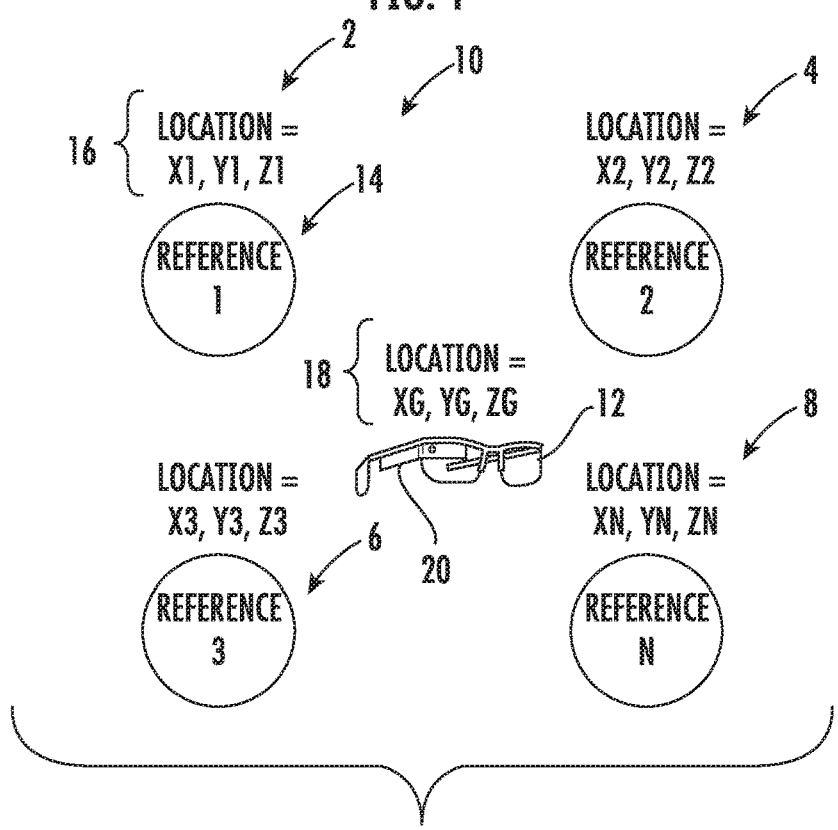
FIG. 2 shows an illustration of tracking the smart glass device location data.

The smart glass device 12 may be configured to update or track the smart glass device location data 18 relative to the reference location 2, or docking/charging station 14, based on movement of the smart glass device 12, as illustrated in FIG. 2. The smart glass device 12 may use a built-in accelerometer 20 to estimate the current location of the smart glass device 12, based on movement of the smart glass device 12, and correspondingly update the smart glass device location data 18 relative to the reference location 2 (FIGS. 1, 2), also referenced herein as the docking/charging station 14. As used herein, an accelerometer may be a gyroscope, or any other device for measuring acceleration or velocity of the smart glass device 12.

Figure 3:
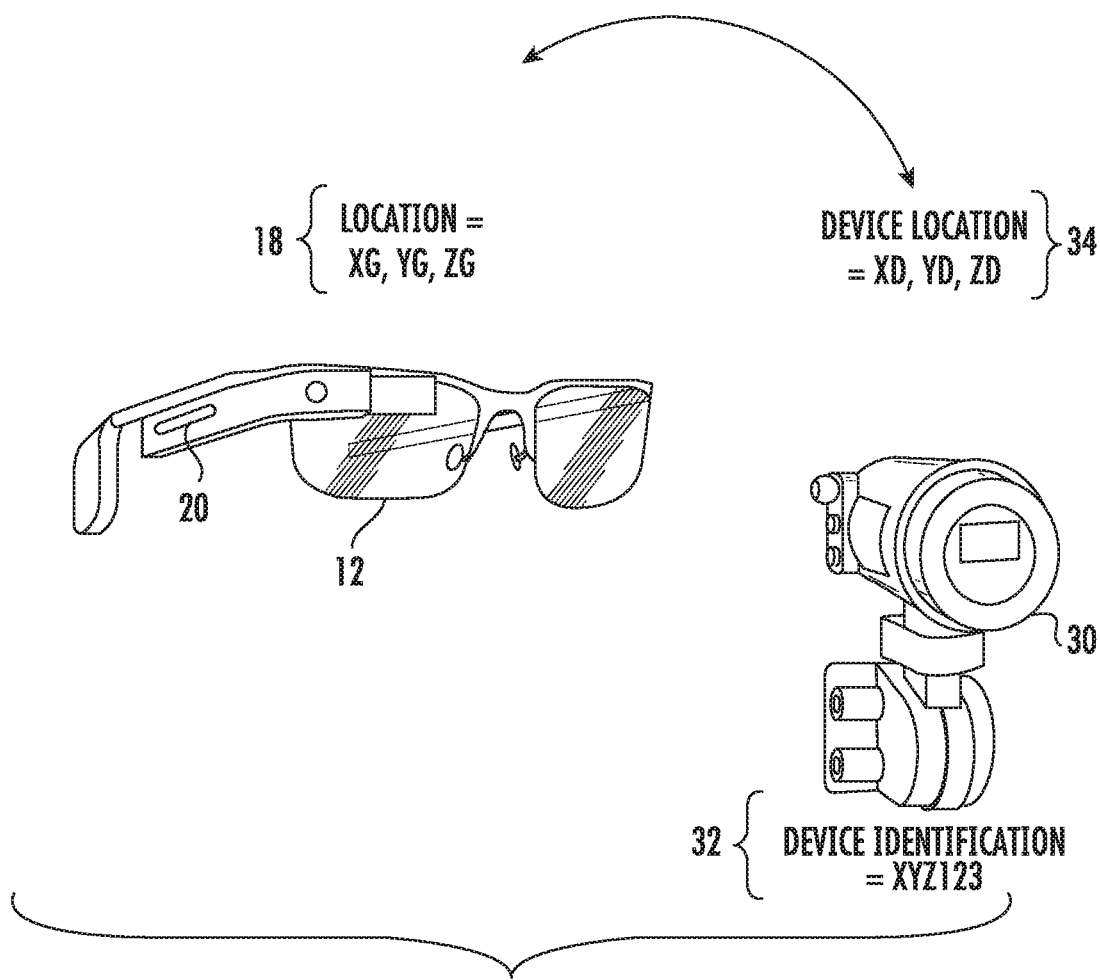
FIG. 3 shows an illustration of a wireless process automation transmitter receiving the smart glass device location data.

FIG. 3 shows an exemplary wireless process automation transmitter 30 capturing the smart glass device location data 18. The wireless process automation transmitter 30 may be coupled with a sensor or other device and may be positioned in or at the area 10 (FIGS. 1,2), for example. The worksite or factory 10, or other area, may include a plurality of wireless process automation transmitters 30, positioned at various locations throughout the worksite or factory 10, including difficult to access locations. The wireless process automation transmitters 30, according to some embodiments, may be coupled to a pressure sensor, level sensor, and/or flow sensor. The smart glass device 12 may be configured to communicate with the one or more wireless process automation transmitters 30 through physical layers such as, for example, Bluetooth, Wi-fi, Wireless Hart, etc.

The exemplary wireless process automation transmitter 30 is preconfigured with transmitter identification data 32 and transmitter location data 34. The transmitter identification data 32 may be programmed at the time of manufacturing or commissioning and may be a unique code identifying the wireless process automation transmitter 30. The transmitter location data 34 may be programmed using the smart glass device location data 18 relative to the reference location 14. This may be accomplished by moving the smart glass device 12 from the reference location 2 to the wireless process automation transmitter 30 and programming the wireless process automation transmitter 30, using wireless communication, with the smart glass device location data 18. The closer the smart glass device 12 is to the wireless process automation transmitter 30 at the time of programming, the more accurate the transmitter location data 34 programmed into the wireless process automation transmitter 30 will be. The wireless process automation transmitter 30 will then wirelessly broadcast its transmitter identification data 32 and transmitter location data 34.

Figure 4:
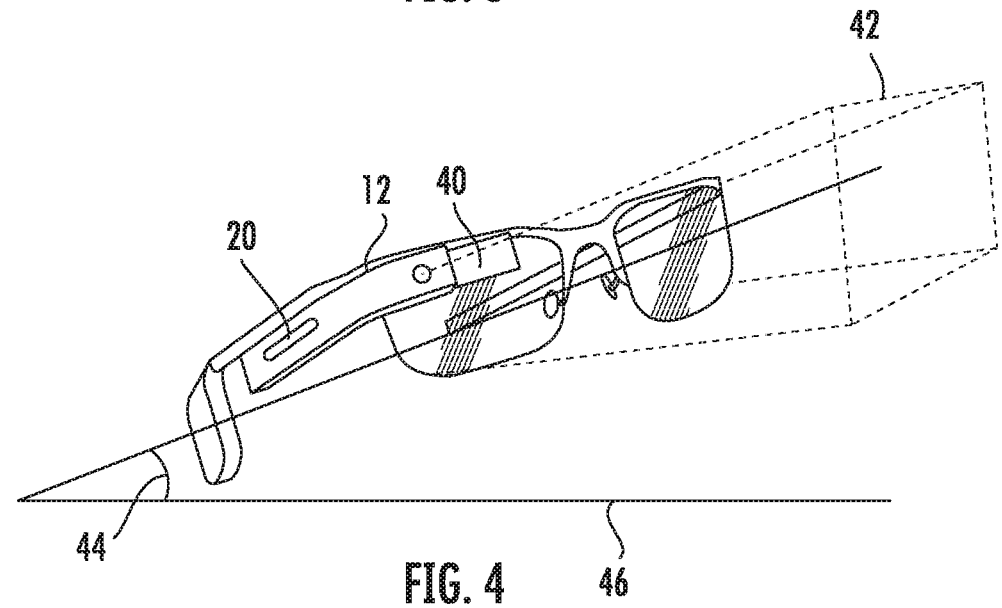
FIG. 4 shows an illustration of a smart glass orientation angle and a smart glass field of view.

FIG. 4 illustrates the exemplary smart glass device 12 and further illustrates a display 40, field of view 42, and orientation angle 44 of the smart glass device 12. The display 40 may be an optical display positioned within the field of view 42 of the user, or wearer, of the smart glass device 12 for displaying information for the user. The display 40 may or may not be transparent. Additionally, or alternatively, the display 40 may be configured to reflect digital images onto the user's field of view 42, allowing the user to see through it. The orientation angle 44, or elevation angle, of the smart glass device 12, which may be dependent on the angle of the user's head relative to a horizontal plane 46, may also be determined using the built-in accelerometers 20 of the smart glass device 12.

Figure 5:
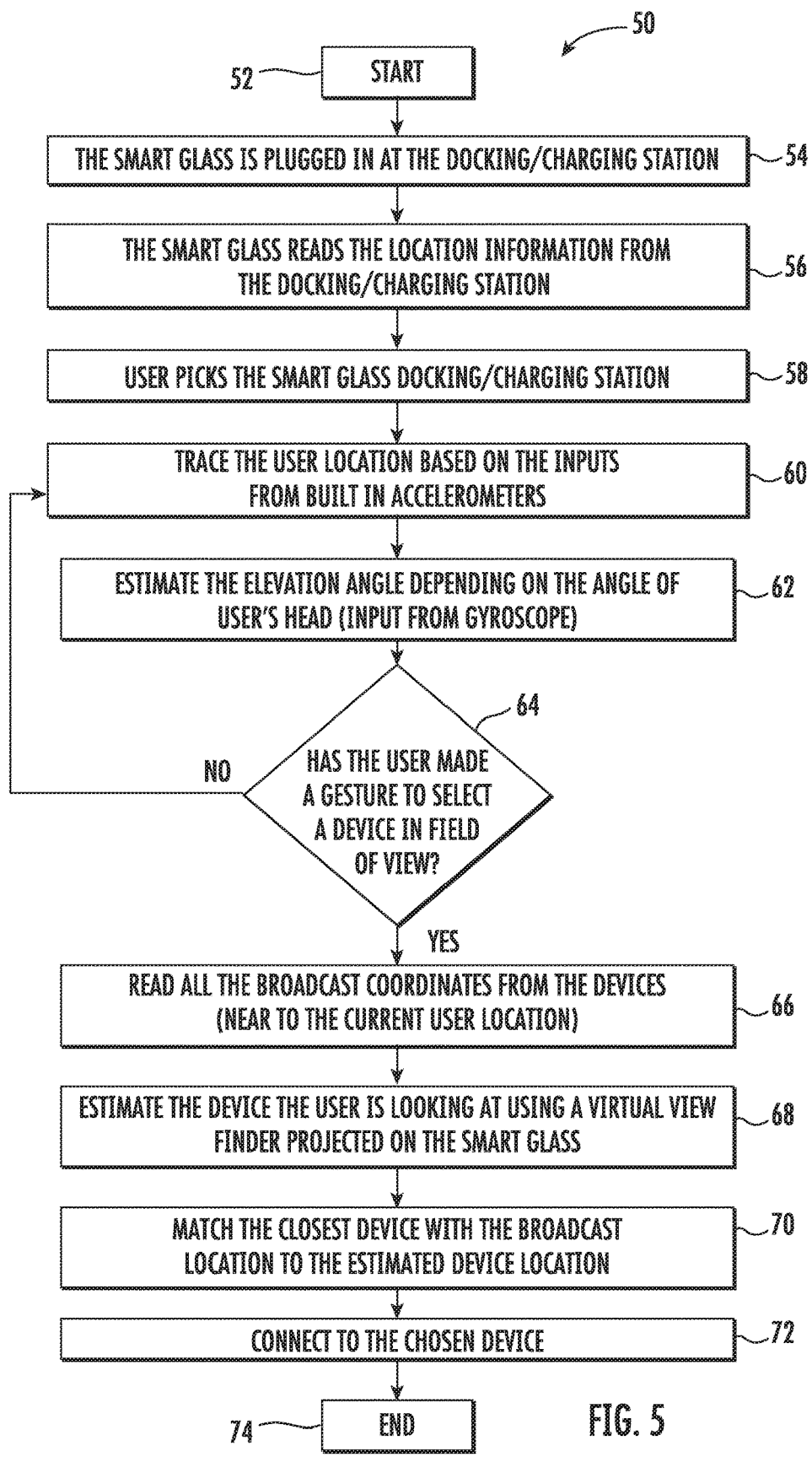
FIG. 5 shows a flow diagram of a method for selecting the wireless process automation transmitter by the smart glass device, according to an aspect of the present disclosure.

Turning now to FIG. 5, and with reference also to FIGS. 1-4, a flowchart 50 of a method for selecting the wireless process automation transmitter 30 using the smart glass device 12 is illustrated. The method begins at a START, at box 52. The method steps may be performed manually or automatically, and the method may be performed at any desired time interval. According to the exemplary embodiment, the method may represent an algorithm operating on the smart glass device 12 that may be initiated based on detection of use of the smart glass device 12, a user action, or another action directly or indirectly detected or received by the smart glass device 12. At box 54, the smart glass device 12 is plugged in at the docking/charging station 14. The smart glass device 12 reads the location information 16 from the docking/charging station 14, at box 56, and selects the smart glass device docking/charging station 14, at box 58. At box 60, the smart glass device location data 18 may be tracked based on inputs from the built-in accelerometers 20. The elevation angle or orientation angle 44 of the smart glass device 12 may be determined using a built-in gyroscope, for example, at box 62.

The method may include determining whether the user has made a gesture to select the wireless process automation transmitters 30 in the field of view 42 of the smart glass device 12, at box 64. A gesture may include a nod of the head, tap on the side of the smart glass device 12, swipe on the side of the smart glass device 12, or use of augmented reality to project the wireless process automation transmitters 30 on the users extended palm and then the user uses a finger to select the wireless process automation transmitter 30 of choice, for example. According to some embodiments, the gesture may simply be use or movement of the smart glass device 12. If the user has not made a gesture to select a wireless process automation transmitter 30 in the field of view 42 of the smart glass device 12, at box 64, the method returns to the method step at box 60. If a gesture is not detected, the smart glass device location 18 and the orientation angle 44 may continue to be tracked.

If the user has made a gesture to select a wireless process automation transmitter 30 in the field of view 42 of the smart glass device 12, at box 64, the method proceeds to box 66. At box 66, all the transmitter location data 34, or broadcast coordinates data, from the wireless process automation transmitters 30 near to, or within a predetermined proximity of, the smart glass device location data 18 and smart glass device orientation angle 44 is read. The wireless process automation transmitter 30 the user is looking at is estimated using a virtual view finder projected on the smart glass device 12, at box 68. The transmitter location data 34 closest to the smart glass device location data 18 in combination with the smart glass device orientation angle 44 will be identified by the smart glass device 12, at box 70. The smart glass device 12 will connect to the selected wireless process automation transmitter 30, at box 72, and receive a status and/or additional information from the selected wireless process automation transmitter 30 and display the information on the display 40 of the smart glass device 12. According to some embodiments, these steps may be performed without user interaction with controls of the smart glass device 12. That is, the closest or only wireless process automation transmitter 30 in the field of view 42 of the smart glass device 12 will be automatically detected without requiring the user to utilize controls of the smart glass device 12 or gestures.

Alternatively, and when multiple wireless process automation transmitters 30 are present in the field of view 42 of the smart glass device 12, the smart glass device 12 may incorporate detection of a gesture by the user to select the desired wireless process automation transmitter 30. Such gestures, as mentioned above, may include a nod of the head, tap on the side of the smart glass device 12, swipe on the side of the smart glass device 12, or use of augmented reality to project the wireless process automation transmitters 30 on the users extended palm and then the user uses a finger to select the wireless process automation transmitter 30 of choice. Although examples are provided, alternative gestures may be used. After display of the status or other information from the selected wireless process automation transmitter 30, the method proceeds to an END, box 74.

Figure 6:
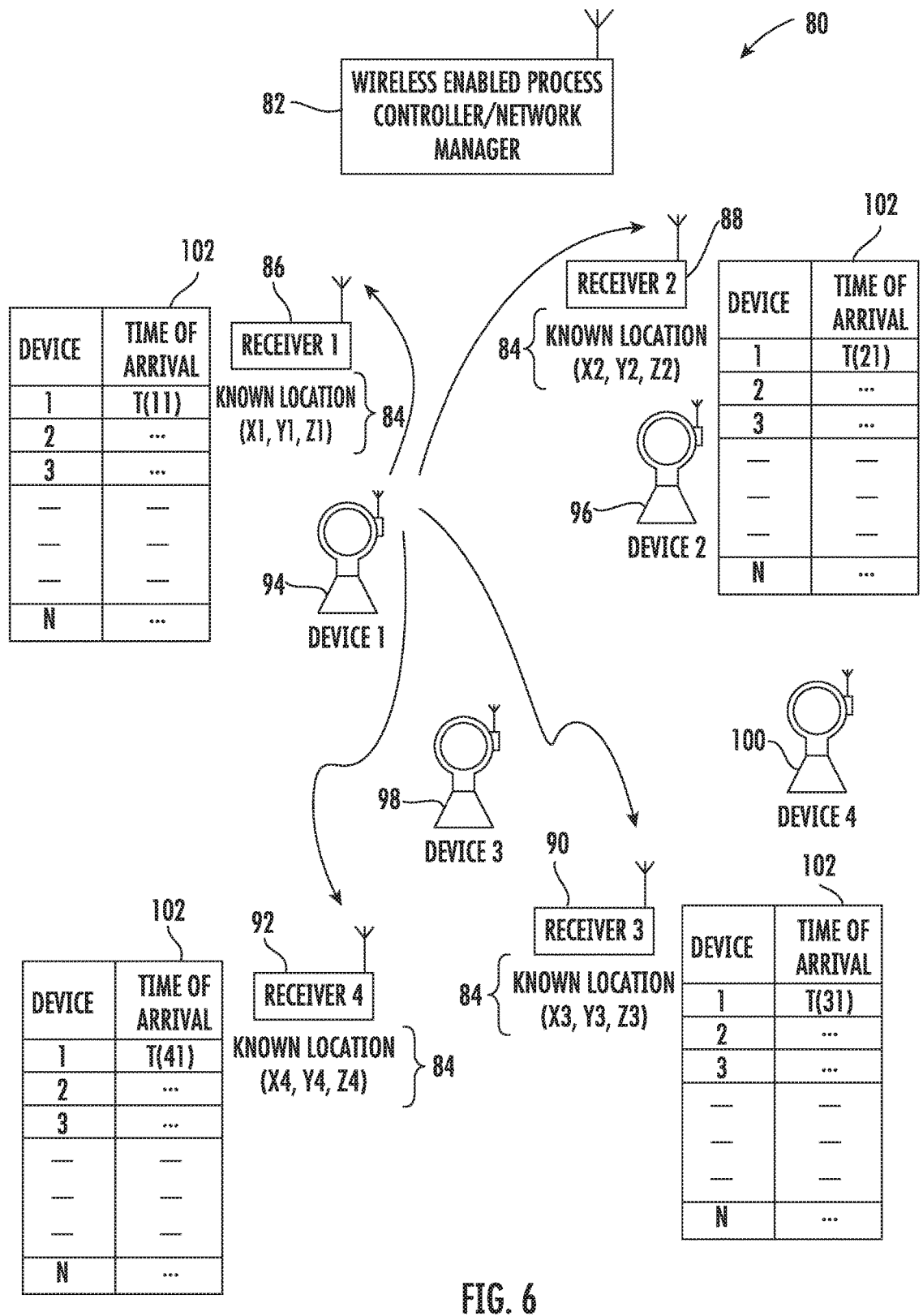
FIG. 6 shows an illustration of time of arrival information at receivers for a first wireless process automation transmitter.

Turning now to FIG. 6, a system 80 for triangulating locations of wireless process automation transmitters 30 is provided. The system 80 includes a network manager 82, or wireless enabled process controller, in communication with a database of network receiver information and corresponding location information 84. Additionally, or alternatively, the network manager 82 may be in direct communication with a plurality of network receivers 86, 88, 90, 92, with each of the network receivers 86, 88, 90, 92 having known corresponding location information 84. According to the exemplary embodiment, the system 80 may be configured to triangulate locations of a first wireless process automation transmitter 94, a second wireless process automation transmitter 96, a third wireless process automation transmitter 98, and a fourth wireless process automation transmitter 100. As described in more detail below, time of arrival information 102 may be acquired by each of the network receivers 86, 88, 90, 92 and used to triangulate locations of the wireless process automation transmitters 94, 96, 98, 100.

Figure 7:
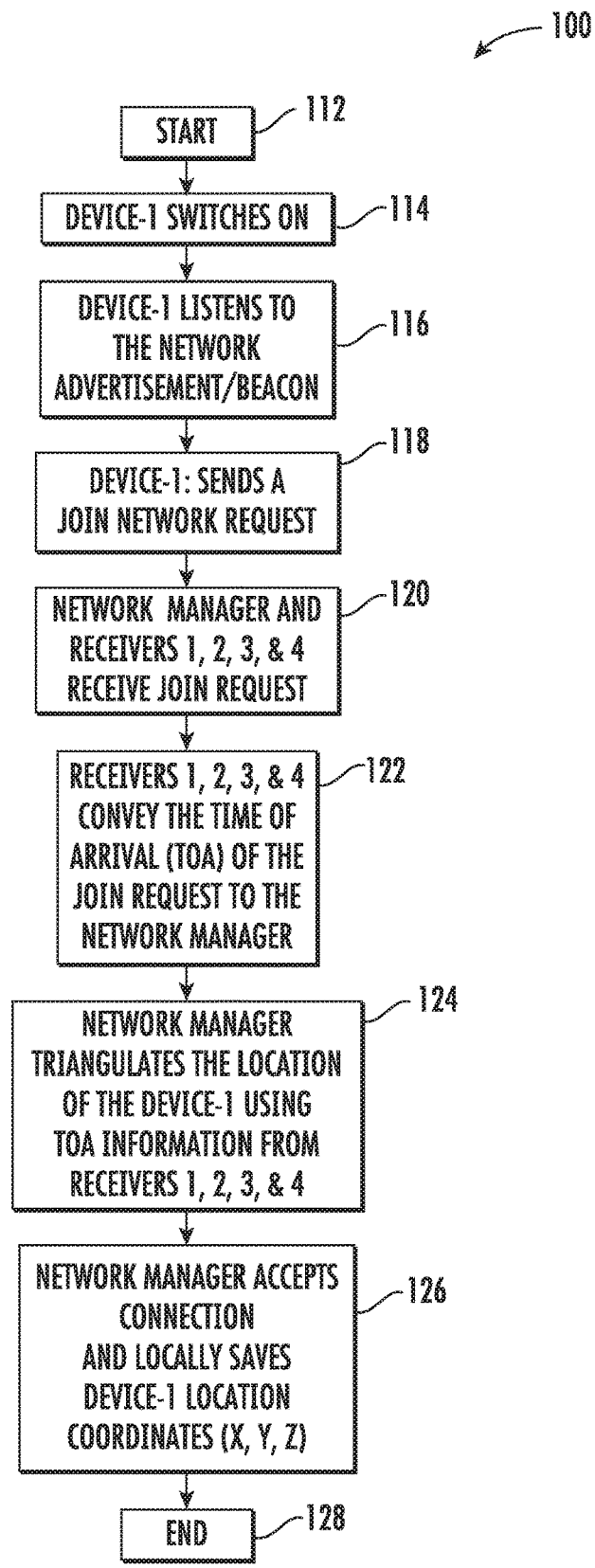
FIG. 7 shows a flow diagram of a method for triangulating a location of the first wireless process automation transmitter, according to another aspect of the present disclosure.

FIG. 7 shows a flow diagram 110 of a method for triangulating a location of the first wireless process automation transmitter 94 using the system of FIG. 6. The method begins at a START, at box 112. At a first step, at box 114, the first wireless process automation transmitter 94 is powered on, or an initialization procedure is otherwise initiated. At box 116, the first wireless process automation transmitter 94 listens for a network advertisement beacon, which is a wireless transmission regarding the presence of a network, containing information about the network. If detected, the first process automation transmitter 94 sends a first join request signal, at box 118. The network manager 82, the first network receiver 86, the second network receiver 88, the third network receiver 90, and the fourth network receiver 92 receive the first join request signal from the first wireless process automation transmitter 94, at box 120.

Each of the network receivers 86, 88, 90, 92 captures time of arrival information 102 corresponding to the first join request signal. This time of arrival information 102 is transmitted to the network manager 82, at box 122, and the network manager 82, in turn, triangulates the location of the first wireless process automation transmitter 94 based on the location information 84 of the network receivers 86, 88, 90, 92 and the time of arrival information 102, at box 124. The network manager 82 may thereafter accept the connection and locally save the location of the first wireless process automation transmitter 94, at box 126. The method then proceeds to an END, at box 128.

Figure 8:
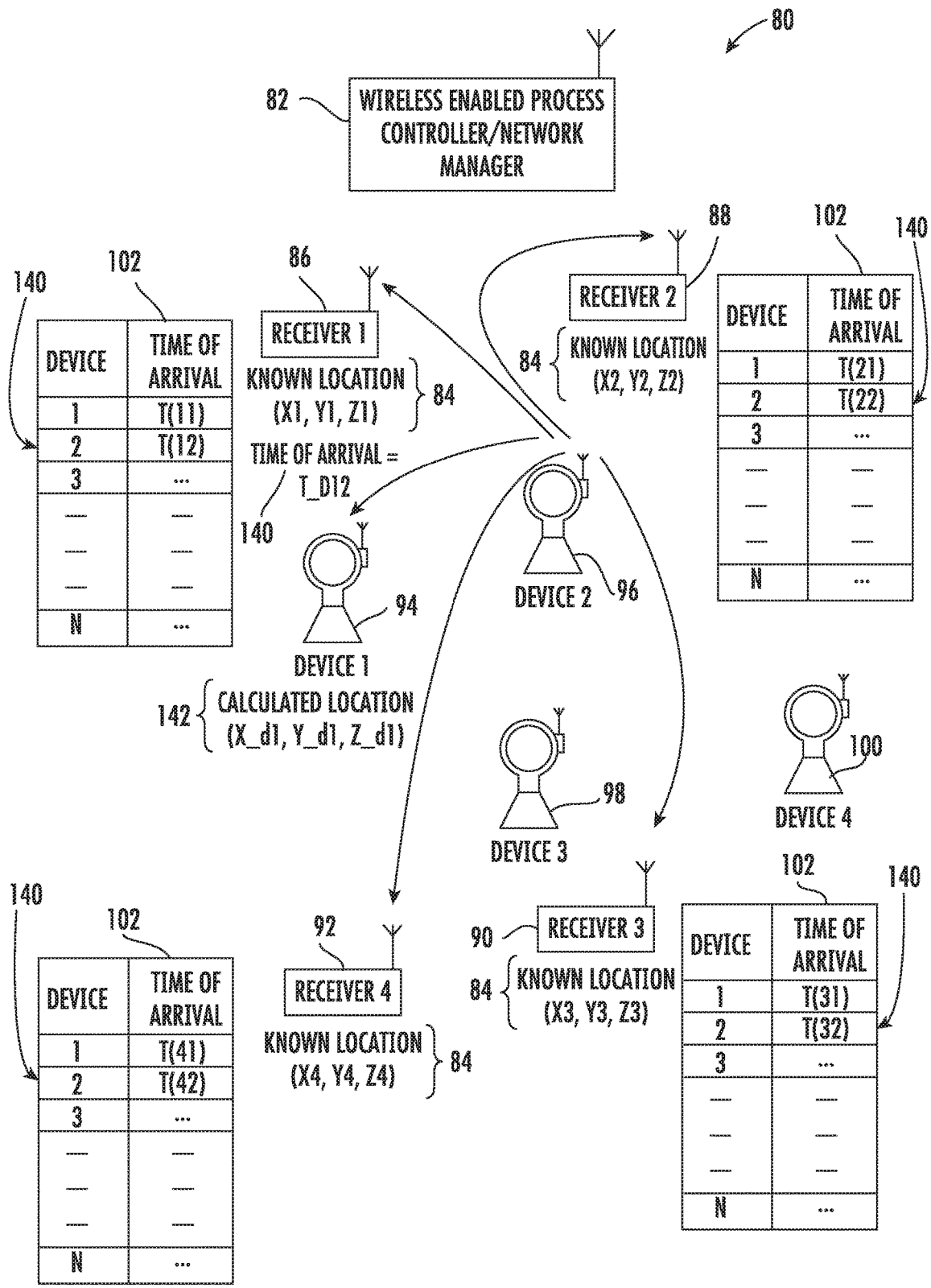
FIG. 8 shows an illustration of time of arrival information at receivers for a second wireless process automation transmitter.

Turning now to FIG. 8, the system 80 may also be configured to triangulate the location of the second wireless process automation transmitter 96. As reflected in FIG. 8 and described with reference to FIG. 10, the network manager 82 may triangulate the location of the second wireless process automation transmitter 96 using a set of time of arrival information 140 from the network receivers 86, 88, 90, 92 and the first wireless process automation transmitter 82, having location information 142 previously triangulated. Further, as shown in FIG. 9, location information for wireless process automation transmitter (N) 150 may be triangulated using time of arrival information 102 from the network receivers 86, 88, 90, 92 and first wireless process automation transmitter 94 to wireless process automation transmitter (N−1), all having previously triangulated location information.

Figure 9:
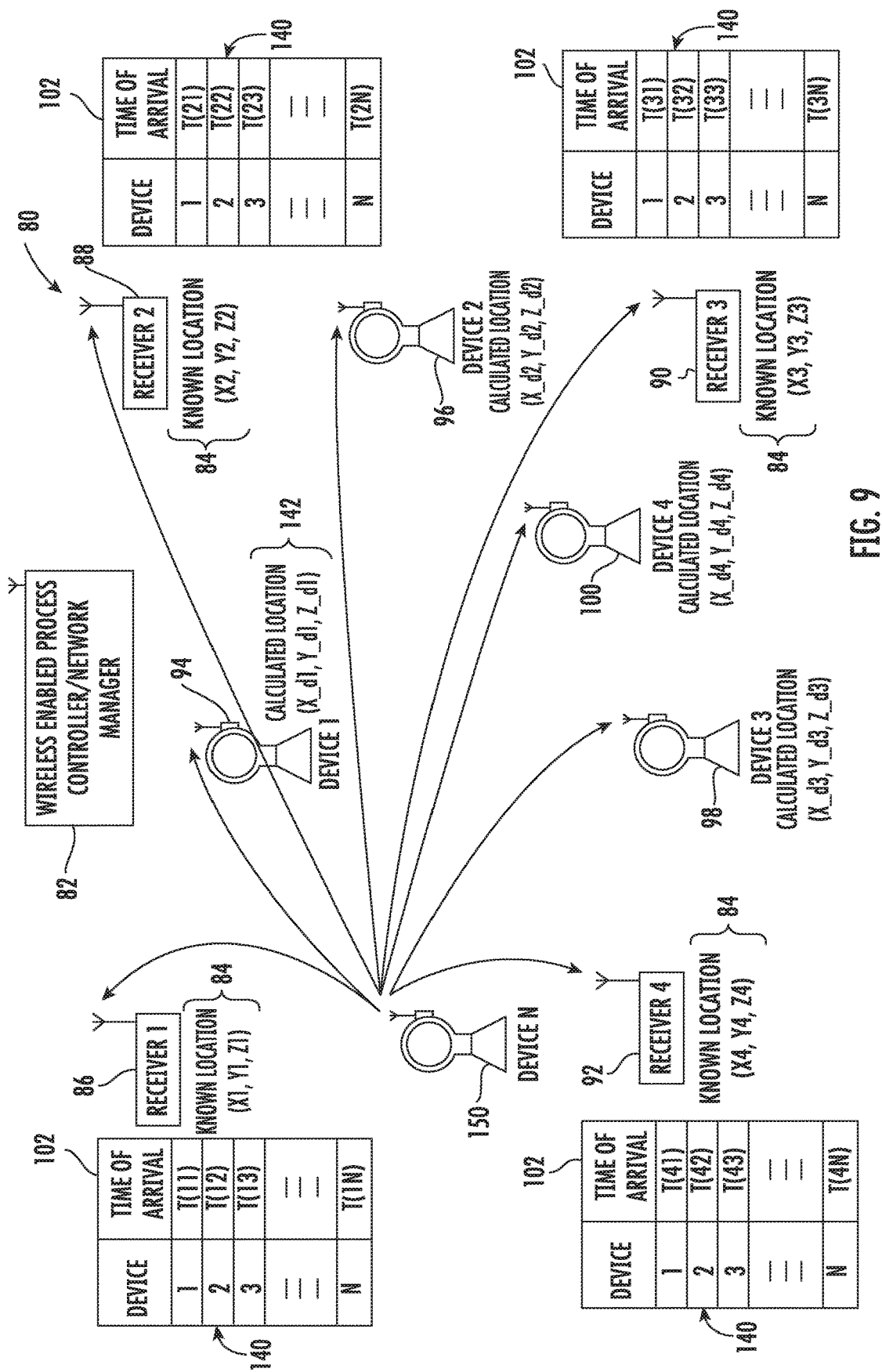
FIG. 9 shows an illustration of time of arrival information at receivers for an $N^{th}$ wireless process automation transmitter.
Figure 10:
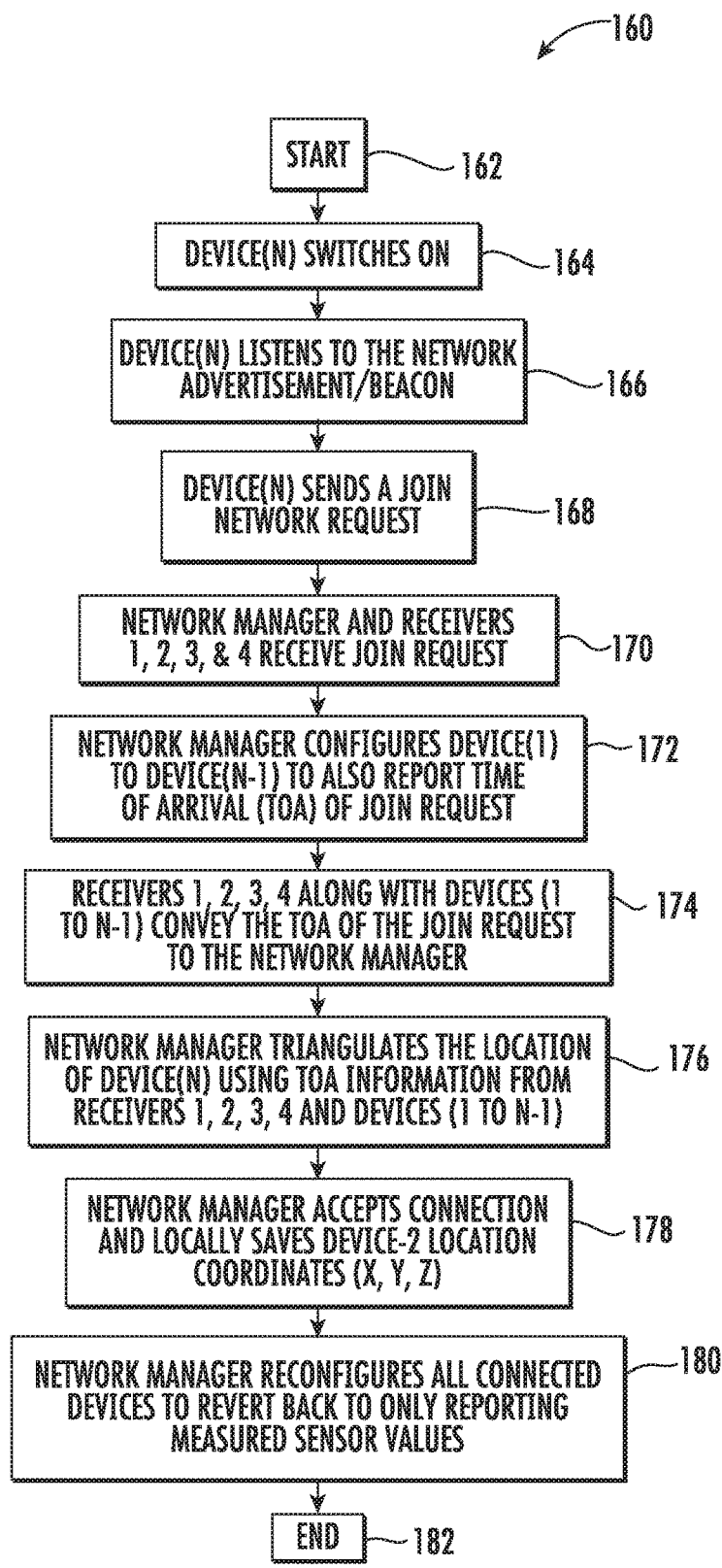
FIG. 10 shows a flow diagram of a method for triangulating a location of the $N^{th}$ wireless process automation transmitter, according to another aspect of the present disclosure.

FIG. 10 shows a flow diagram 160 of a method for triangulating a location of the wireless process automation transmitter (N) 150 using the system 80, as illustrated in FIG. 9. The method begins at a START, at box 162. At a first step, at box 164, the wireless process automation transmitter (N) 150 is powered on, or an initialization procedure is otherwise initiated. At box 166, the wireless process automation transmitter (N) 150 listens to the network advertisement beacon and, in response, sends a join request signal, at box 168. At box 170, the network manager 82, the first network receiver 86, the second network receiver 88, the third network receiver 90, and the fourth network receiver 92 receive the join request signal. Thereafter, at box 172, the network manager 82 reconfigures the first wireless process automation transmitter 94 through wireless process automation transmitter (N−1) to a mode in which the first wireless process automation transmitter 94 also reports time of arrival information 102.

As a result, the network receivers 86, 88, 90, 92 and the first wireless process automation transmitter 94 through wireless process automation transmitter (N−1) capture and convey time of arrival information 102, at box 174. At box 176, the network manager 82 triangulates the location of the wireless process automation transmitter (N) 150 based on this time of arrival information 102. The network manager 82, at box 178, may thereafter accept the connection and locally save the location of the wireless process automation transmitter (N) 150. Finally, at box 180, the network manager 82 may reconfigure the first wireless process automation transmitter 94 through wireless process automation transmitter (N−1) to revert to a normal operating state of reporting sensor values. The method then proceeds to an END, at box 182.

Figure 11:
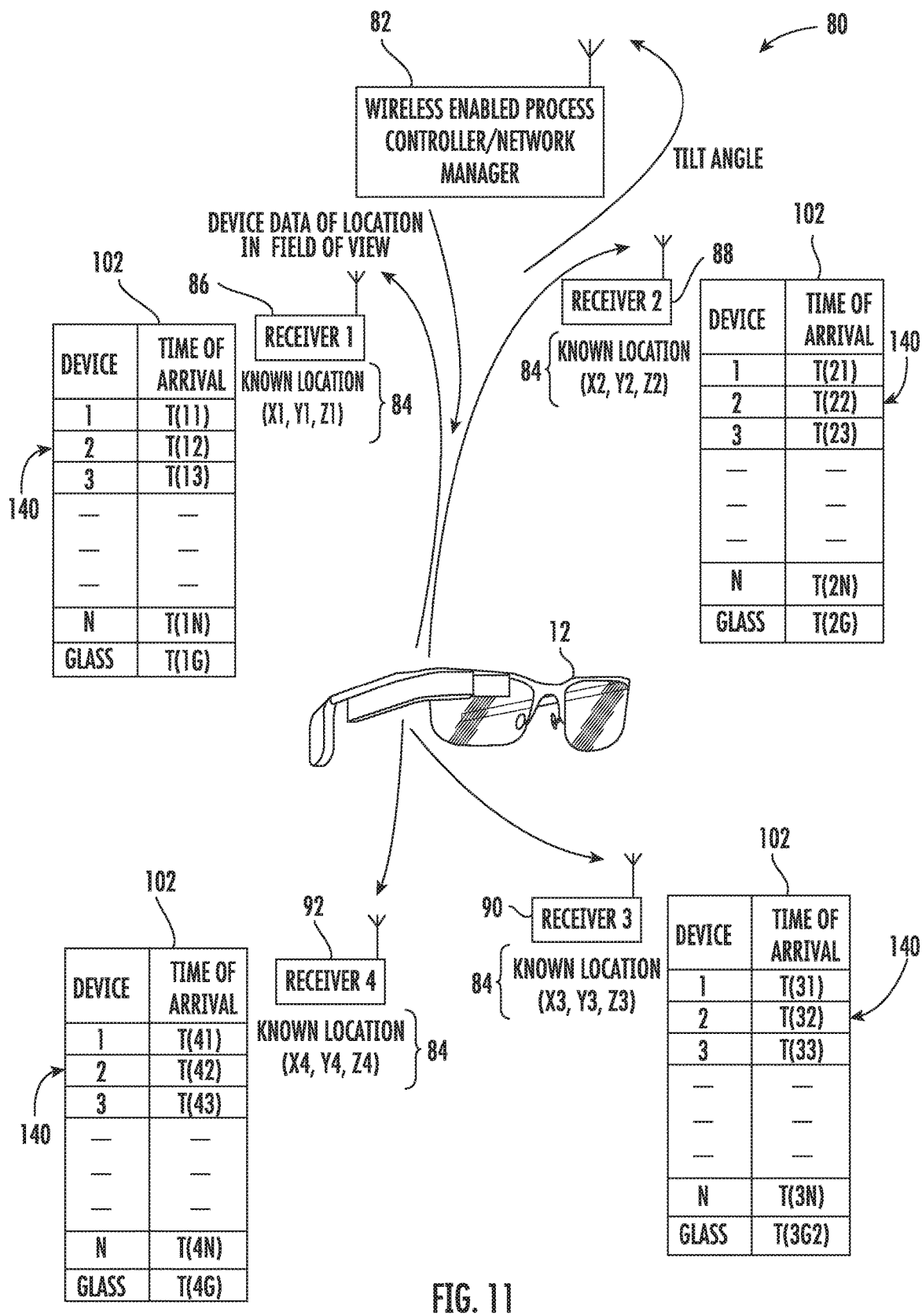
FIG. 11 shows an illustration of time of arrival information at receivers for the smart glass device.
Figure 12:
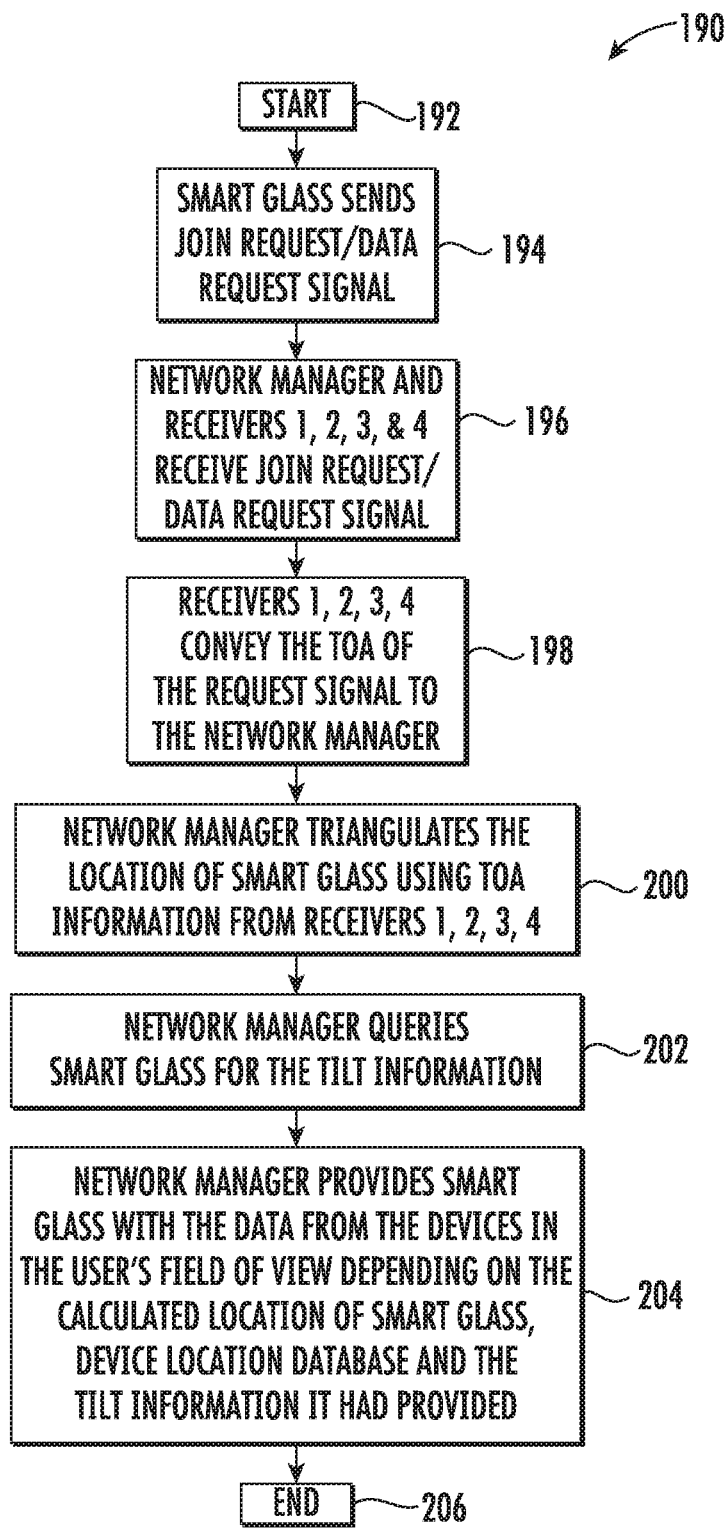
FIG. 12 shows a flow diagram of a method for triangulating a location of the smart glass device and identifying wireless process automation transmitters in the field of view of the smart glass device, according to another aspect of the present disclosure.

Turning now to FIG. 11, the system 80 may also be configured to triangulate the location of the smart glass device 12. FIG. 12 shows a flow diagram 190 of a method for triangulating a location of the smart glass device 12 using the system 80 of FIG. 11, and identifying wireless process automation transmitters 94, 96, 98, 100 in the field of view 42 of the smart glass device 12. The method begins at a START, at box 192. At a first step, at box 194, the smart glass device 12 sends a join request signal. At box 196, the network manager 82 and the network receivers 86, 88, 90, 92 receive the join request signal and, at box 198, the network receivers 86, 88, 90, 92 convey time of arrival information 102 to the network manager 82. At box 200, the network manager 82 triangulates the location of the smart glass device 12 using time of arrival information 102 from the network receivers 86, 88, 90, 92. At a next step, at box 202, the network manager 82 queries the smart glass device 12 for the orientation angle 44.

Using the locations 84 of the network receivers 86, 88, 90, 92, the location of the smart glass device 12, and the orientation angle 44, the network manager 82 determines which of the wireless process automation transmitters 94, 96, 98, 100 are in the field of view 42 of the smart glass device 12 (box 204). For example, the network manager 82 may determine whether the first wireless process automation transmitter 94 is in the field of the view 42. The display 40 of the smart glass device 12 may be configured to dynamically receive and/or display information corresponding to the first wireless process automation transmitter 94, and any of the other wireless process automation transmitters 96, 98, 100, in the field of view 42 of the smart glass device 12. The steps of determining and conveying locations of the wireless process automation transmitters 94, 96, 98, 100, updating the location of the smart glass device 12, and determining whether the first wireless process automation transmitter 94 is in the field of view 42 of the smart glass device 12 may be repeated at a predetermined time interval. The method ultimately proceeds to an END, at box 206.

In the industrial setting, there are often many wireless process automation devices near to each other, all wirelessly transmitting data. In environments utilizing smart glass devices, a user goes through a set of steps using an interface displayed on the smart glass device to select the wireless process automation device of choice to facilitate further interactions with the wireless process automation device. When the user is done interacting with the selected wireless process automation devices, the user de-selects the wireless process automation devices using the interface and selects the next wireless process automation device of choice. These steps increase the time and effort to perform user activities relative to the wireless process automation device.

The present disclosure makes the identification and selection of a wireless process automation device using the smart glass device easier and more accurate. The present disclosure provides systems and methods for estimating locations for wireless process automation devices, which may be coupled with sensors or other devices, and smart glass devices. For example, the present disclosure teaches systems and methods for estimating locations of the beforementioned devices relative to a reference point, estimating locations using triangulation and time of arrival data, and automating identification of wireless process automation devices in the field of view of the smart glass device and selection of a wireless process automation device. Thus, the present disclosure provides a means for improving the operation of a smart glass device in the field of process automation.

While various embodiments have been described in considerable detail herein, the embodiments are merely offered by way of non-limiting examples of the disclosure described herein. It will therefore be understood that various changes and modifications may be made, and equivalents may be substituted for elements and steps thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Such sequences may be varied and still remain within the scope of the present disclosure. Therefore, the particular order of the steps disclosed herein should not be construed as limitations of the present disclosure.

What is claimed is:

1. A system for triangulating a location of a wireless process automation transmitter for use by a smart glass device, comprising:
   a network manager in communication with a database of network receiver information and corresponding location information;
   a first wireless process automation transmitter configured to transmit a first join request signal;
   a plurality of network receivers configured to receive the first join request signal and transmit a first set of time of arrival information to the network manager;
   the network manager configured to triangulate a location of the first wireless process automation transmitter based on the location information of the network receivers and the first set of time of arrival information;
   the smart glass device configured to transmit a second join request signal;
   the plurality of network receivers configured to receive the second join request signal and transmit a second set of time of arrival information to the network manager;
   the network manager configured to triangulate a location of the smart glass device based on the location information of the network receivers and the second set of time of arrival information;
   the smart glass device configured to transmit an orientation angle of the smart glass device to the network manager;
   the network manager configured to determine if the first wireless process automation transmitter is in a field of view of the smart glass device based on the location of the first wireless process automation transmitter, the location of the smart glass device, and the orientation angle; and
   a display of the smart glass device configured to display information corresponding to the first wireless process automation transmitter when the first wireless process automation transmitter is in the field of view of the smart glass device.

2. The system of claim 1, further comprising:
a second wireless process automation transmitter;
wherein the network manager is configured to triangulate a location of the second wireless process automation transmitter based on the location information of the receivers and the location of the first wireless process automation transmitter.

3. The system of claim 2, wherein the network manager is configured to reconfigure the first wireless process automation transmitter to a receive mode when the second wireless process automation transmitter transmits a join request signal.

4. The system of claim 3, wherein the network manager is configured to reconfigure the first wireless process automation transmitter to a report sensor value mode after the location of the second wireless process automation transmitter is determined.

5. The system of claim 1, further comprising:
a plurality of wireless process automation transmitters;
wherein the network manager is configured to triangulate locations of the plurality of wireless process automation transmitters and transmit information to the smart glass device corresponding to each of the plurality of wireless process automation transmitters in the field of view of the smart glass device.

6. The system of claim 5, wherein the network manager is configured to update the locations of the plurality of wireless process automation transmitters and transmit information to the smart glass device at a predetermined frequency.

7. The system of claim 1, wherein the network manager is configured to update the location of the smart glass device at a predetermined frequency.

8. The system of claim 7, wherein the network manager is configured to determine if the first wireless process automation transmitter is in the field of view of the smart glass device at a predetermined frequency.

9. The system of claim 1, wherein the smart glass device is configured to determine the orientation angle using an accelerometer of the smart glass device.

10. The system of claim 1, wherein the first wireless process automation transmitter is at least one of a pressure sensor, a level sensor, and a flow sensor.

11. A method for triangulating a location of a wireless process automation transmitter for use by a smart glass device, comprising steps of:
storing receiver information, including location information, for a plurality of receivers in a network;
transmitting a first join request signal from a wireless process automation transmitter;
receiving the first join request signal at the receivers and transmitting a first set of time of arrival information to the network manager;
triangulating a location of the wireless process automation transmitter by the network manager based on the location information of the receivers and the first set of time of arrival information;
transmitting a second join request signal from a smart glass device;
receiving the second join request signal at the receivers and transmitting a second set of time of arrival information to the network manager;
triangulating a location of the smart glass device based on the location information of the receivers and the second set of time of arrival information;
transmitting an orientation angle of the smart glass device from the smart glass device to the network manager;
determining if the wireless process automation transmitter is in a field of view of the smart glass device based on the location of the wireless process automation transmitter, the location of the smart glass device, and the orientation angle; and
displaying information corresponding to the wireless process automation transmitter on a display of the smart glass device if the wireless process automation transmitter is in the field of view of the smart glass device.

12. The method of claim 11, further comprising triangulating a location of a second wireless process automation transmitter based on the location information of the receivers and the location of the first wireless process automation transmitter.

13. The method of claim 12, further comprising reconfiguring the first wireless process automation transmitter to a receive mode when the second wireless process automation transmitter transmits a join request signal.

14. The method of claim 13, further comprising reconfiguring the first wireless process automation transmitter to a report sensor value mode after the location of the second wireless process automation transmitter is determined.

15. The method of claim 11, further comprising triangulating locations of the plurality of wireless process automation transmitters; and transmitting information to the smart glass device corresponding to each of the plurality of wireless process automation transmitters in the field of view of the smart glass device.

16. The method of claim 15, further comprising updating the locations of the plurality of wireless process automation transmitters; and transmitting information to the smart glass device at a predetermined frequency.

17. The method of claim 11, further comprising updating the location of the smart glass device at a predetermined frequency.

18. The method of claim 17, further comprising determining if the first wireless process automation transmitter is in the field of view of the smart glass device at a predetermined frequency.

19. The method of claim 11, further comprising determining the orientation angle using an accelerometer of the smart glass device.

20. The method of claim 11, wherein the first wireless process automation transmitter is at least one of a pressure sensor, a level sensor, and a flow sensor.

* * * * *